Feb. 12, 1935.  E. J. W. RAGSDALE  1,990,752
RADIATOR CONSTRUCTION
Filed June 23, 1931
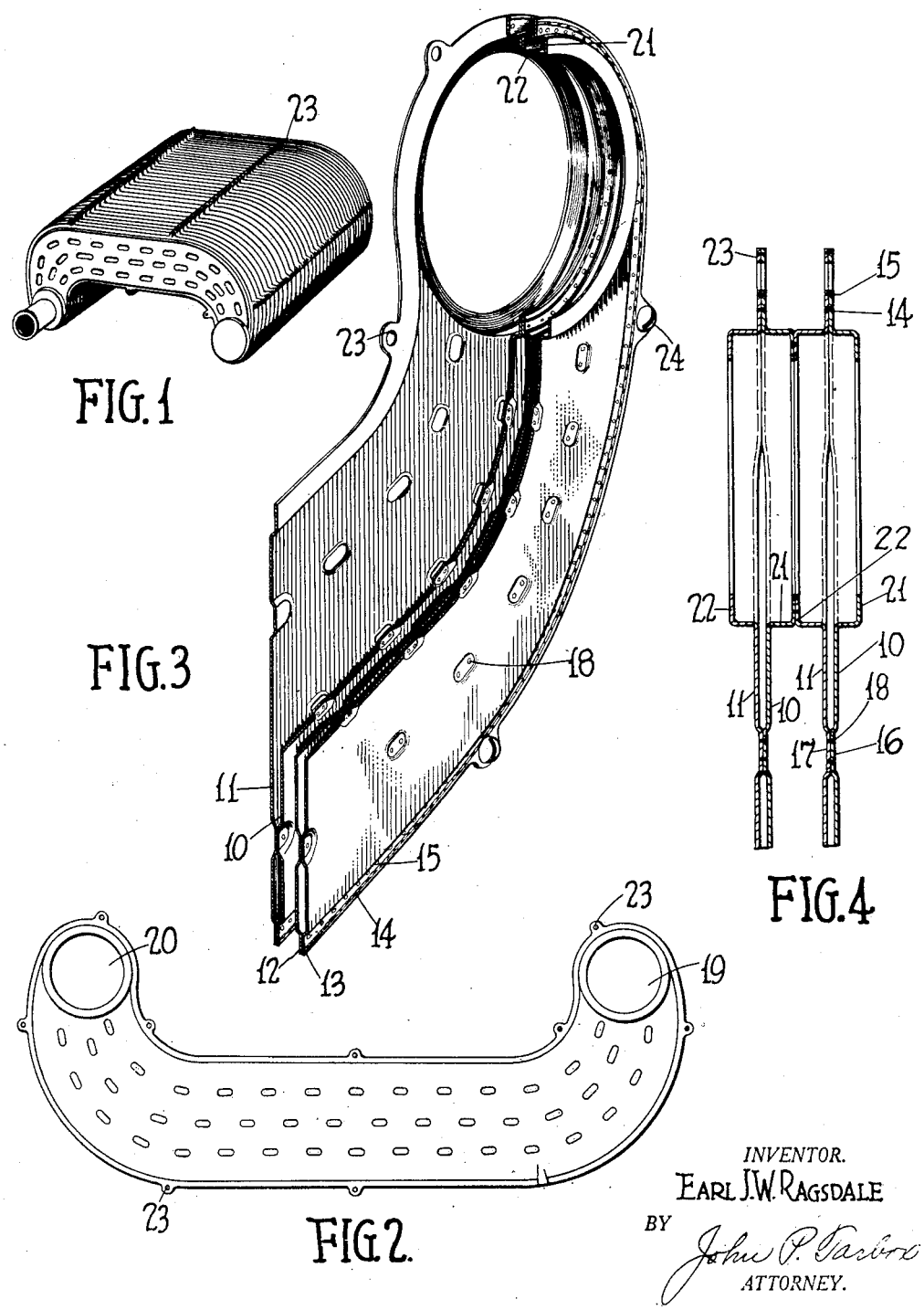
INVENTOR.
EARL J.W. RAGSDALE
BY
John P. Tarbox
ATTORNEY.

Patented Feb. 12, 1935

1,990,752

UNITED STATES PATENT OFFICE 1,990,752

RADIATOR CONSTRUCTION

Earl J. W. Ragsdale, Norristown, Pa., assignor to Edward G. Budd Manufacturing Company, Philadelphia, Pa., a corporation of Pennsylvania Application June 23, 1931, Serial No. 546,222

4 Claims. (Cl. 257—139)

The invention relates to radiator construction and particularly to a radiator construction well adapted for use in aircraft.

It is an object of my invention to provide a radiator construction of this class which is exceedingly light yet strong and durable, which can be readily built up in units and sub-assemblies and can be readily assembled in the final assembly by welding operations. It is a further object of my invention to provide a radiator having a high radiating efficiency. I attain these objects in part by constructing the radiator of unit sections made out of symmetrical stampings of a material of great strength and durability, and which lends itself readily to joinder by welding, which may yet be of a very light gauge, such as .014 stainless steel, a material which is very well adapted for this use because it possesses these qualities in a very high degree.

The stampings are so formed in their peripheries that they may be readily joined together by welding to make a watertight joint and in other regions, so that the various units may be joined together by a water-tight connection where they communicate with the influx and efflux openings of the radiator. Provision is also made to constitute the elements entering into this joint at the openings, means for spacing the units to permit the cooling air to flow freely between the sections. The sections are further given such shape that the air may freely sweep through between the radiator units in any direction at right angles to the plane of the units.

Other and further objects and advantages and the means by which they are attained will become clear from the following detailed description when read in connection with the accompanying drawing, in which Fig. 1 is a perspective view showing a complete radiator built according to the invention.

Fig. 2 is a side elevational view of one unit of the radiator.

Fig. 3 is a fragmentary perspective view of several units of the radiator with parts broken away to better show the construction, and Fig. 4 is a fragmentary cross section view through two adjacent units.

According to my invention the entire radiator is built up of units each comprising a pair of stampings 10 and 11 symmetrical about the plane of joinder. The stampings are generally of shallow U-shape, as seen in Fig. 2, for a purpose hereinafter explained, but it is obvious that the particular shape might vary with the location and use of the radiator.

Each of the symmetrical stampings forming a unit is formed in its periphery with an offset flange numbered, respectively, 12 and 13, these edge flanges of the two stampings mate and space the stampings in their bodies. The stampings are secured together in their edges through said flanges, in this instance, by an outer continuous line resistance weld 14 making an absolutely water-tight joint around the periphery of the units. By resistance weld is meant any weld in which the heat energy to produce the weld is generated by the resistance to the passage of the welding current through the parts to be joined. This weld may be conveniently made by an overlapping series of spot welds made by electrodes having a chisel-like edge.

To strengthen the joint and to further insure its water-tightness, and to remove the strain due to pressure within a unit, a second line 15 of spot welds joins the stampings inwardly of and parallel to the line weld 14.

To further reinforce the units against internal pressures, the opposed stampings 10 and 11 are formed at a number of spaced points in their bodies with inward offsets formed by indentations 16 and 17, respectively. The indentations on the opposed stampings abut through their bottom walls and are secured together by spot welds 18.

The stampings are further formed adjacent each end thereof with enlarged openings 19 and 20, which openings extend longitudinally through the entire radiator, one opening being closed at one end of the radiator and the other at the other end of the radiator. The opposite ends of the openings from their closed ends are connected, respectively, to the influx and efflux conduit for the cooling fluid.

Each of the stampings 10 and 11 is formed around the openings 19 and 20 therein with an outwardly offset flange designated, respectively, 21 and 22, the flanges 21, 22 of adjacent units mating, and spacing the units throughout their bodies to allow ample space between the units for the air to flow through. The flanges 21, 22 are securely joined together by a double line of welds to form a strong water-tight joint similar to the joint in the outer periphery of the units.

The stampings are further formed with perforated ears 23 at spaced intervals around their periphery, through which extend securing means such as bolts 24 holding the entire radiator in assembled relation, so that the strain is removed from the flanges around the openings 19 and 20 securing the adjacent units together.

The particular construction of radiator herein shown is particularly adapted for use on aircraft, where the radiator is usually located in the air stream from the propeller, and particularly where the axis of the propeller is shiftable, as on dirigibles. By reason of the shallow U-shaped arrangement, the passages 19 and 20 which form an obstruction to the passage of the air through the radiator are removed laterally from the main body of the radiator and do not seriously interfere with the free flow of the air over the main body of the radiator in any direction at right angles to the length of the radiator as a whole.

What I claim is:

1. A radiator structure built up of similar units each comprising a pair of stampings spaced in their bodies and mating offset flanges in their peripheries, and joined in their peripheries with a continuous line weld, the opposite ends of said units being provided with openings, and the stampings forming the units being formed around said openings with outwardly offset flanges, the flanges extending inwardly of the openings parallel to the plane of the stampings of one unit mating those of an adjacent unit and spacing the units, the mating flanges of adjacent units being secured together around said openings by a continuous line weld resistance.

2. A radiator structure built up of similar units each comprising a pair of stampings symmetrical as respects their plane of joinder, and jointed together in their outer peripheries to form a water-tight joint, the stampings forming the units being formed with aligned openings adjacent their opposite ends and provided around said openings with outwardly offset flanges, the flanges of one unit mating those of an adjacent unit and spacing the units to permit the circulation of air between the bodies of the units, and a continuous line weld joining the flanges of adjacent units, and a second line of welds parallel to the first.

3. A radiator construction built up of similar units each comprising a pair of stampings joined in their peripheries and formed adjacent their ends with openings, the openings of the units being aligned to form influx and efflux openings, the stampings of each unit being formed around said openings with outwardly offset flanges, the flanges of adjacent units mating and spacing the units and secured together to form a water tight joint between the units in the margin of said openings, the stampings of the units being formed in their peripheries with perforated ears for receiving the members for securing the units together to form the complete radiator.

4. In a hollow sheet metal structure, complemental sheet metal parts joined together by lapped angular flanges by a continuous fluid tight electrical resistance line weld between the angular flanges, said parts having main body portions at substantially right angles with respect to said flanges so that the continuous fluid tight resistance line weld cannot be made immediately adjacent to said angular main body portions whereby when the hollow structure is subjected to internal fluid pressure those portions of the flanges lying between the line weld and the said angular portions of the main bodies are forced apart by the fluid pressure to spread apart the inwardly lying portions of the flanges and open the line weld, which said flanges are joined together additionally by a line of spaced spot welds lying inwardly of the said continuous fluid tight resistance weld and closely adjacent to said angularly extending portions of the main body whereby the tendency of internal fluid pressure to force said portions of the flanges lying inwardly of the continuous line weld is effectively resisted and said flanges are retained together and the opening of the line weld is prevented.

EARL J. W. RAGSDALE.